Nov. 10, 1931.  C. HORSLEY ET AL  1,831,006
CONTROLLING MEANS FOR ELECTRIC CIRCUITS
Filed May 31, 1929

INVENTOR
CAPERTON HORSLEY
&
BY  EDWIN R. GOLDFIELD

Brockett, Hyde, Higley & Meyer
ATTORNEYS

Patented Nov. 10, 1931

1,831,006

UNITED STATES PATENT OFFICE

CAPERTON HORSLEY AND EDWIN R. GOLDFIELD, OF CLEVELAND, OHIO, ASSIGNORS, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA

CONTROLLING MEANS FOR ELECTRIC CIRCUITS

Application filed May 31, 1929. Serial No. 367,534.

This invention relates to means for automatically controlling alternating current flow to make said current flow substantially independent of variations in applied line voltage.

The invention has for its object a new, simplified and less expensive manner of accomplishing the described result, which result in itself is not new.

We effect our described object by arranging inductance and capacitance elements in series relation in a circuit to be supplied from the line, and arranging the load circuit to be in parallel relation with the inductance or a portion thereof; and we further arrange that the inductance element have an impedance which decreases with an increase in voltage impressed thereupon and within the operating range.

Figure 2:
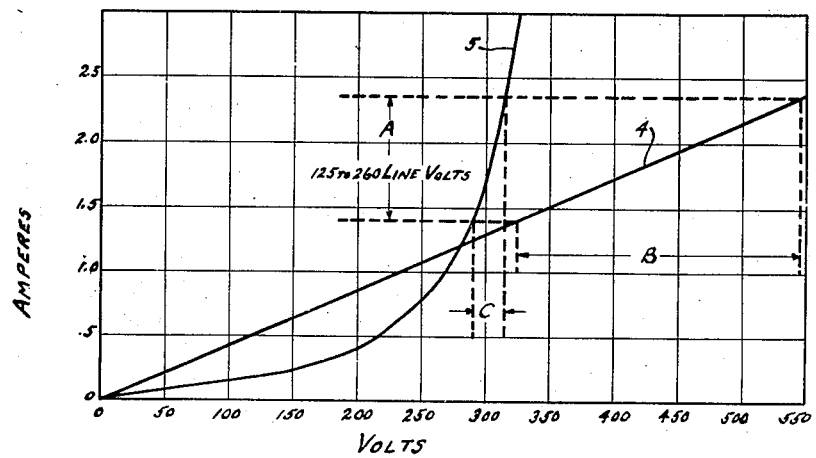
Figure 3:
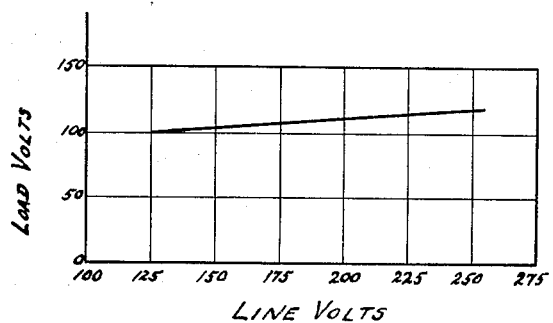
Figure 1:
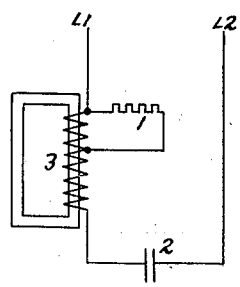

The exact nature of our invention together with further objects and advantages thereof will be apparent from the following description taken in connection with the accompanying drawings in which Fig. 1 is a diagrammatic representation of an elementary circuit in which the principles of our invention are embodied; Fig. 2 is a graphical representation of the operating characteristics of parts appearing in Fig. 1; and Fig. 3 is a graphical representation of the results accomplished.

With reference now to the drawings and particularly to Fig. 1 thereof, 1 represents a load to be supplied with alternating current from the line L1—L2. According to our invention we provide the line circuit indicated, including the condenser or capacitance element 2 and the inductance element 3. We also provide the load circuit indicated in which the load 1 is arranged, which circuit is shunted across or in parallel relation with the inductance element 3. As indicated, the load circuit includes only a portion of the inductance element 3, but it will be appreciated that the inductance element will function after the manner of an auto-transformer with respect to the relation between the load circuit and the line circuit so that the load circuit may include any portion up to the entire inductance element 3. Likewise the line circuit may of course include a portion only of the inductance element.

The inductance element 3, which is indicated in Fig. 1 as having an iron core, is so designed that the flux density of the iron will approach a condition of saturation when the voltage impressed thereon is increased above normal operating value. Therefore, as the voltage impressed upon the inductance element is increased, the impedance thereof will decrease.

With reference now to Fig. 2, the characteristics of the capacitance and inductance elements are graphically indicated on a system of rectangular coordinates wherein abscissae represent electromotive force in volts impressed upon the elements, and ordinates represent current in amperes therethrough.

The impedance characteristic of the capacitance element is represented by the line 4 which will be noted as a straight line leading from the point of zero volts and zero amperes, and leading upward at an angle with the horizontal base line.

The curve 5 represents the impedance characteristics of the inductance element 3. This curve leads from the point of origin of the line 4, to the right and increasingly upwards; the curvature and variation therein being determined by the saturation characteristics of the core of the inductance; saturation commencing at a lower portion of the curve as in Fig. 2 at about 175 volts and saturation being complete as the curve straightens out at its upper end as at about 300 volts, Fig. 2.

In Fig. 2, the curve 5 crosses the line 4. It is not necessary that the inductance characteristic be such that the curve 5 pass below the line 4. It will be noted, however, as will be apparent to one familiar with the art, that the inductive reactance and condensive reactance are of opposite sign so that where the curve 5 is above the line 4 the resultant reactance in the line circuit is capacitative; whereas where the curve 5 is below the line 4 the resultant reactance in the circuit is inductive.

The inductance and capacitance elements are proportioned or designed to have the desired impedance characteristics over the operating range of line voltage variation. Thus as indicated Fig. 2, an operating range A of line voltage from 125 to 260 is provided for. Also as indicated, through this operating range the variation B in voltage across the capacitance will be between about 325 and about 545; and the corresponding variation C in voltage across the inductance will be from about 290 to about 315.

So that while the applied line voltage may rise from 125 to 260, the voltage across the inductance 3, which of course controls the load voltage, rises only from 290 to 315.

To obtain maximum stabilization of the load voltage, the curve 5 should be such that lines drawn tangent to portions of the curve in the operating range would, in Fig. 2, intersect the voltage base line at as nearly 90° and as great a distance from the zero end of this line as the circumstances of design permit; while the line 4 should be as nearly parallel to the voltage base as possible.

Fig. 3 is a graphic representation of the stabilization effected by the arrangement indicated in Figs. 1 and 2, illustrating the stabilized and relatively slight variation in load voltage produced by relatively great fluctuation in line voltage.

We claim:

1. Means for automatically controlling alternating current flow to make said current flow substantially independent of variations in applied line voltage, comprising inductance and capacitance elements arranged in series relation in a circuit, with the load in parallel relation with the inductance element, said inductance element having an impedance that decreases with an increase in voltage impressed thereupon.

2. Means for automatically controlling alternating current flow to make said current flow substantially independent of variations in applied line voltage, comprising inductance and capacitance elements arranged in series relation in a circuit, with the load in parallel relation with a portion of the inductance element, said inductance element having an impedance that decreases with an increase in voltage impressed thereupon.

3. Means for automatically controlling alternating current flow to make said current flow substantially independent of variations in applied line voltage, comprising inductance and capacitance elements arranged in series relation in a circuit, with the load and said inductance being so related that the latter functions as an auto-transformer, said inductance element having an impedance that decreases with an increase in voltage impressed thereupon.

4. Means for automatically controlling alternating current flow to make said current flow substantially independent of variations in applied line voltage, comprising inductance and capacitance elements arranged in series relation in a circuit, with the load in parallel relation with the inductance element, said inductance element having such impedance characteristics that the plotted curve which graphically represents the same, with rectangular coordinates having potential as abscissæ and current as ordinates, shall have portions in the operating range tangent to straight lines intersecting the abscissa base line at substantially right angles thereto and intersecting said line from its zero end a distance corresponding to the minimum line voltage of the operating range, and said capacitance element having such capacitance characteristics that its corresponding graphical representation is at a very small angle from parallel with said base line for the purpose described.

5. Means for automatically controlling alternating current flow to make said current flow substantially independent of variations in applied line voltage, comprising inductance and capacitance elements arranged in series relation in a circuit, with the load in parallel relation with the inductance element, said inductance element having an impedance characteristic which decreases with an increase in voltage impressed thereupon and said capacitance element having an impedance characteristic which is proportioned to the impedance characteristic of said inductance element to permit only a fraction of the wide variation of voltage over the operating range to be impressed upon the parallel connected load.

6. Means for automatically controlling alternating current flow to make said current flow substantially independent of variations in applied line voltage, comprising inductance and capacitance elements arranged in series relation in a circuit, with the load in parallel relation with the inductance element, said inductance element having an impedance characteristic which decreases with an increase in voltage impressed thereupon and said capacitance element having an impedance characteristic which is so proportioned to the impedance characteristic of said inductance element that a variation of more than 100% in voltage over the operating range causes only a variation of less than 12% in said parallel connected load.

In testimony whereof we hereby affix our signatures.

CAPERTON HORSLEY.
EDWIN R. GOLDFIELD.